(12) United States Patent
Morrow

(10) Patent No.: US 6,374,689 B1
(45) Date of Patent: Apr. 23, 2002

(54) CONTINUOUS LOAD BALANCING GEAR SETS

(75) Inventor: William Bruce Morrow, Santa Barbara, CA (US)

(73) Assignee: Harrier Technologies, Inc., Greenwich, CT (US)

(*) Notice: Subject to any disclaimer, the term of this patent is extended or adjusted under 35 U.S.C. 154(b) by 0 days.

(21) Appl. No.: 09/575,387

(22) Filed: May 22, 2000

(51) Int. Cl.⁷ .............................................. F16H 57/00
(52) U.S. Cl. ............................. 74/410; 74/331; 74/342
(58) Field of Search ..................... 74/410, 325, 331

(56) References Cited

U.S. PATENT DOCUMENTS

| | | | | |
|---|---|---|---|---|
| 2,982,146 A | * | 5/1961 | Stoeckicht | 74/466 |
| 3,327,548 A | * | 6/1967 | Welch | 74/410 |
| 3,559,498 A | * | 2/1971 | Narsted | 74/410 |
| 3,772,934 A | * | 11/1973 | Warren | 74/410 |
| 4,442,728 A | * | 4/1984 | Jahnel | 74/361 |
| 4,641,543 A | * | 2/1987 | Jessup | 74/410 |
| 5,344,230 A | * | 9/1994 | Kowalczyk et al. | 366/100 |
| 5,588,328 A | * | 12/1996 | Nihei et al. | 74/409 |
| 5,927,147 A | * | 7/1999 | Morrow | 74/410 |
| 6,189,397 B1 | * | 2/2001 | Morrow et al. | 74/410 |
| 6,334,368 B1 | * | 1/2002 | Morrow | 74/410 |

* cited by examiner

Primary Examiner—David Fenstermacher
(74) Attorney, Agent, or Firm—Daniel B. Haase, Esq.

(57) ABSTRACT

Apparatus for balancing loading in a direct drive transmission in which the power input to the transmission is divided between and among intermediate drive shafts and delivered to the output of the transmission, and wherein balancing mechanisms are in constant contact with, and senses the forces on, the intermediate shafts resulting from the delivery of power from the input to the intermediate shafts, and balances those forces among the intermediate shafts to deliver optimum power to the transmission output.

13 Claims, 3 Drawing Sheets

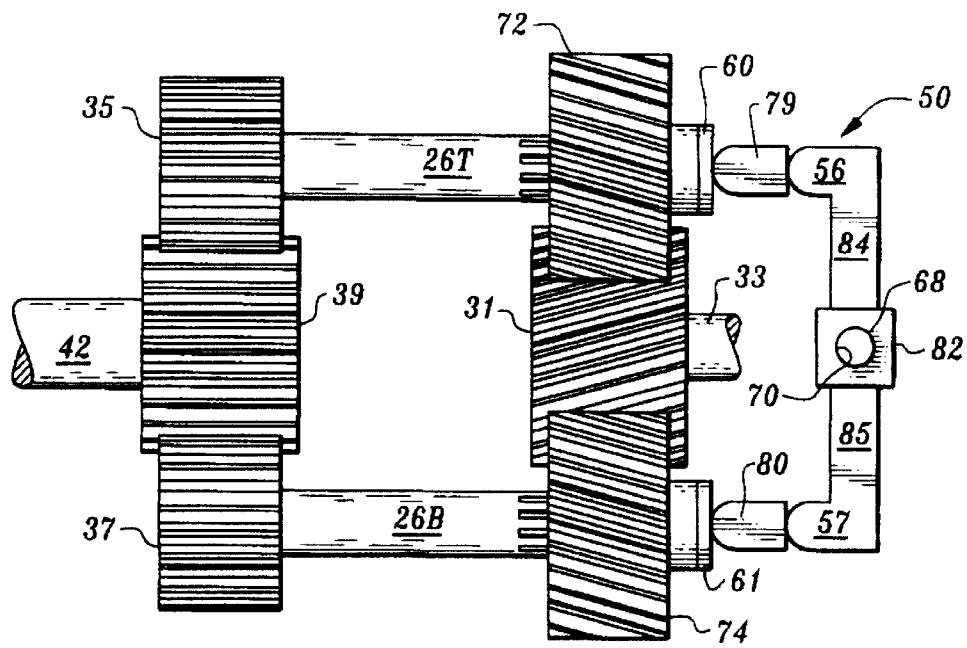
Fig. 3
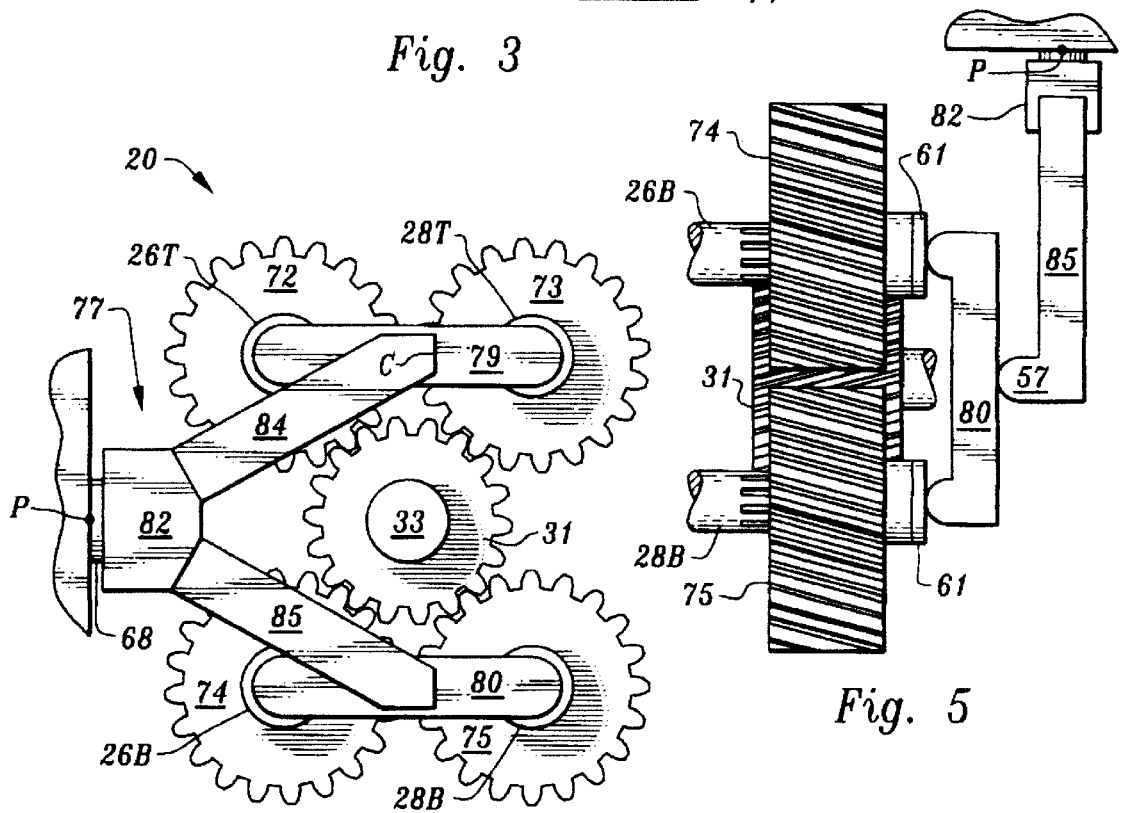
Fig. 4
Fig. 5

CONTINUOUS LOAD BALANCING GEAR SETS

The present invention relates generally to a direct drive transmission in which helical gear sets divide and share input power between and among a multiplicity of intermediate gears to ultimately drive an output gear set, and wherein the loading on the intermediate gears is continuously mechanically balanced to provide uniform driving forces to the output gearset.

BACKGROUND OF THE INVENTION

1. Field of the Invention

The power transmission industry constantly seeks a way to transmit large loads through small systems. However, in the absence of the use of exotic, high cost alloys, the design and construction of direct drive transmissions are often limited as to size by virtue of the particular application and, accordingly, limited as to the load they can effectively transmit.

One way to reduce the overall size of the transmission is to divide, or split, the load carrying capacity of any given system into multiple paths defined by smaller load carrying elements, which would then permit a reduction in the size of the gears needed per element to transmit a design load. Then, by select spacing and positioning of the elements, the overall size of the transmission is easily reduced.

As is well known, however, when multiple load carrying elements are receiving power from an input source for delivery to an output, whether it be in a step up or step down mode, there is an opportunity, indeed, likelihood, for imbalance between such elements which tends to accentuate wear and create an imbalance at the output end, even creating damaging harmonics, all of which tends to defeat the purpose of dividing the input power.

It will be appreciated that an unbalanced application of power, wherever it may occur in a transmission, inevitably results in uneven wear in the gearing and cyclic, or otherwise erratic, power output which, if not quickly ameliorated, will exacerbate the damage to the transmission itself, as well as any equipment to which it is drivingly connected.

2. Overview of the Prior Art

The concerns addressed by the present invention are not particularly new, although the solution offered herein is believed novel. Others have attempted to formulate a solution, including Mr. Morrow in his recently issued U.S. Pat. No. 5,927,147, which addresses and successfully resolves, gear loading problems in a specific environment not related to the present circumstances.

In the 20's and continuing into the 30's, it appears that Westinghouse Electric was heavily involved in the construction of large transmissions for use in sea going ships and the like, and the balancing of loads from multiple power sources was of considerable concern. It appears from the patent art that the floating frame concept was prevalent at the time for balancing loading from multiple input sources, as evidenced by the Hodgkinson U.S. Pat. Nos. 1,502,199 and 1,591,826, coupled with Allen U.S. Pat. No. 1,502,224, all of which disclose a framework within which driving pinions are mounted for some limited movement to balance loading on them.

This observation is relevant only to explain the environment within which Herr U.S. Pat. No. 1,820,740 appears to have exclusive utility. Herr employs floating frames within which drive pinions are retained. A lever 40 is disposed between the frames and is flanked by flexible members and constrained by bolts on either side of the flexible members. A member disposed between the floating frames separates them and is pinned at one end to a fulcrum that allows limited movement and at the other end by a piston which constrains movement, except to a very limited extent. While Herr facially has an appearance similar to the present structure, that is where the similarity ends. As will be seen in Herr, and the art similarly situated, pressure exerted on the member disposed between the movable frames, by one of the frames, results in the opening and/or closing of the valves to apply fluid pressure at one end thereof, causing counter movement of that member to restore balance to the frames.

While there is an abundance of prior art directed at the general concept of balancing loads on gears, and more particularly helical gears, there is a paucity of such art wherein input loading is divided among pairs of intermediate transmission paths and wherein load balancing is achieved by sensing reactive forces on associated pairs of intermediate transmission elements and responding to those forces by balancing them in order that the load transmitted by such elements is uniform to the output of the transmission.

As will become apparent from a further reading of this specification, while the art referenced seems to recognize a similar, albeit not the same, problem and offers several solutions involving a movable gear or pinion, the invention taught herein represents what is believed to be a significantly and patentably different approach to the problem articulated above.

SUMMARY OF THE INVENTION

Having explored the environment in which the present invention has particular, although perhaps not exclusive, utility, it will now be appreciated that the geared transmission of the type addressed herein comprises, in one form, one or more pairs of helical gear sets, typically on parallel shafts, in operative engagement with a power input source, and capable of delivering the power therefrom in a uniform balanced manner to the transmission output.

Clearly, therefore, a principal objective of the present invention is to provide a transmission of the type having a power input and pairs of intermediate elements engaging the input to split the power therefrom and deliver that power in a uniform and balanced manner to the transmission output.

A further objective, incident to the foregoing, is to provide such a transmission which can deliver significant power from a single source to a driven member in an efficient and economical manner, with minimal wear and tear on the components which define the transmission, and to accomplish this in a package which is smaller than would otherwise be anticipated given the load parameters.

Yet another objective of the present invention is to provide for the positive and continuous mechanical balancing of loads on pairs of intermediate transmission elements which are in driving engagement with an input source by sensing imbalance between intermediate geared elements and continuously loading the element of a pair of elements which is not carrying as much load as its companion, and accomplishing this instantaneously to achieve continuous balance between and among pairs.

While the foregoing delineates several significant and practical objectives attainable by the structure of the invention, no effort has been made to articulate all of the objectives that are met by the gear set of the present invention, and others will become apparent to those skilled in the art as the forthcoming description of a preferred embodiment is studied, in conjunction with the appended drawings, wherein:

DESCRIPTION OF THE DRAWINGS

The drawings, which illustrate the invention in its principal forms in significant detail, contain the following figures:

FIG. 3 is a side elevation of a transmission such as shown in FIG. 1 and illustrating the versatility of the invention by demonstrating the invention as employed with two pairs of intermediate gear sets, rather than one, as shown in FIG. 1;

FIG. 4 is a pictorial view, in right end elevation similar to that of FIG. 2, but illustrating, in some detail, a variation on the lever balance mechanism of FIG. 2 as it would appear when used with two pairs of intermediate gear sets, as may be found in FIG. 3;

FIG. 5 is a side elevation of a transmission of the present invention, again with the casing cut away, and illustrating in detail the operative relationship between a modified balancing mechanism depicted in FIG. 4, as it interacts with the intermediate gears of the transmission;

Having thus described the several views of the drawings, the essential aspects of the invention will now be detailed in the following description of a preferred embodiment.

DESCRIPTION OF A PREFERRED EMBODIMENT OF THE INVENTION

Figure 1:
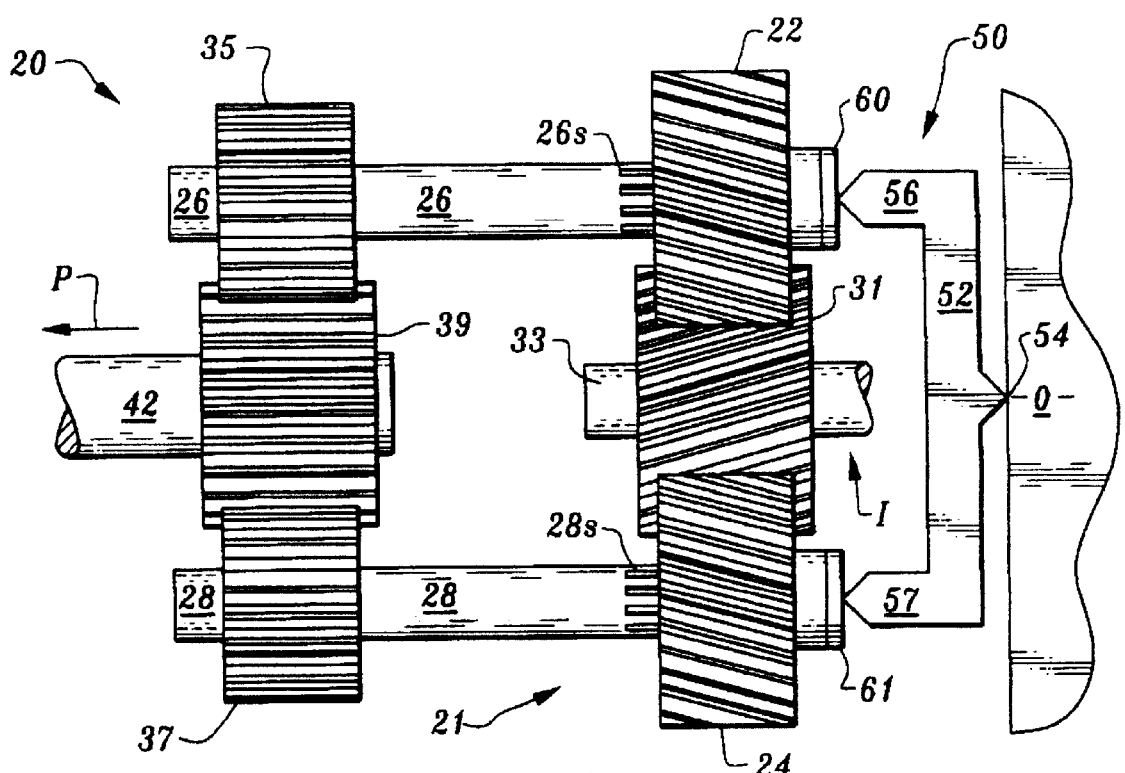
FIG. 1 illustrates, in side elevation, a simple direct drive transmission wherein the casing is cut away to illustrate the operative gear train, and wherein dual drive trains deliver the power from the power input gear to the output gear, and load balancing between the gear trains is provided to continuously attenuate any disparity in the loading being experienced by the gears on the intermediate shafts at any given instant.

With reference now to the drawings, and initially to FIG. 1, a direct drive transmission 20 is there shown in side elevation with the casing cut away in order to permit a full view of the drive train.

Figure 2:
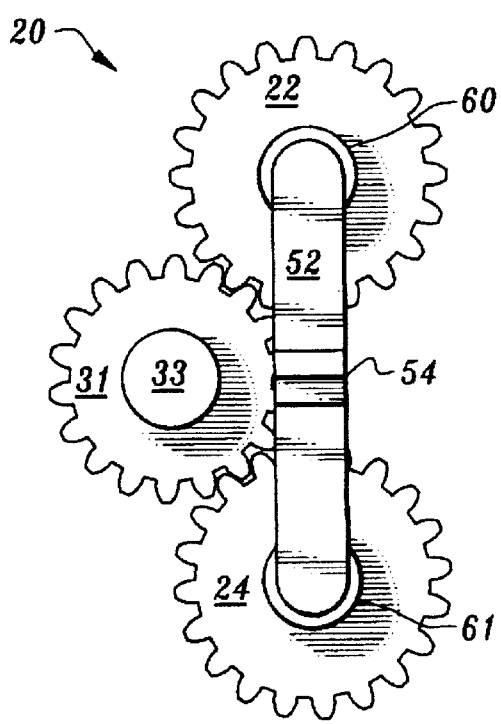
FIG. 2 is a pictorial view, in right end elevation of FIG. 1, illustrating the mechanism by which load balance on the intermediate gearing is achieved in accordance with the teachings of the present invention.

The transmission 20 of FIG. 1 is characterized as having a single power input gear set indicated generally at 21, power to which may be from any one of several well known power generating devices not shown, delivered to a plurality of companion intermediate drive pinions 22 and 24, each having helical teeth and each of which is mounted on a separate intermediate jack shaft, 26 and 28. The pinions 22 and 24 act in concert to receive and transmit power from drive gear 31, disposed on input shaft 33, which may be best seen in FIG. 2, which is offset slightly to the right, although it works equally well to the left, for clearance purposes.

Power into the transmission from the shaft 33 is transmitted through drive gear 31, through driven pinions 22 and 24 to the intermediate jack shafts 26 and 28, which operate as a pair. In order that the power from the input gear 31 can be delivered to an output side of the transmission 20, drive pinions 35 and 37 are secured, in any suitable fashion, to the intermediate jack shafts 26 and 28, respectively, and rotate therewith.

The companion driven pinions 35 and 37 on each of the jack shafts 26 and 28 are so positioned as to be properly aligned and fully engaged with the output gear 39 of the transmission.

Still in reference to the FIG. 1 embodiment, however, the jack shafts 26 and 28 may be splined, as at 26S and 28S, in any well known manner, beneath the pinions 22 and 24, in order that the pinions may move axially by a limited amount in response to reactive forces, which is the anticipated response in helical gears as a consequence of the transfer of power between the pinions 22 and 24 acting against the gear 31.

A purpose of splitting the input power between pinions 22 and 24 is, of course, to permit optimization of the size of the drive pinions, thereby permitting the overall size of the transmission to be smaller than might otherwise be anticipated given the value of the power input. However, by virtue of disparate manufacturing tolerances and procedures, it is not always true that the power is split evenly between the input pinions and; as is well understood in the art, dimensional differences in the dedendum, addendum, root and pitch circles and the like, between companion pinions 22 and 24 will contribute, to a greater or lesser degree, to a disparity in the load carried by a particular pinion.

In helical gears, loading will manifest itself in forces tending to move the pinion laterally to the left or right along the axis of the supporting shaft and will depend on a variety of parameters in addition to the torque being applied, e.g. the angle of the helical teeth, the direction of rotation, and the gear diameter which determines the pitch circle. Unbalanced loading will result in accelerated wear and contribute to the cost of use by virtue of increased maintenance and inevitable down time.

In order, therefore, to permit the instantaneous and continuous balancing of loads on and between, in this instance, companion pairs of pinions, in this instance, pinions 22 and 24, the present invention contemplates the use of a simple but effective device for continuously leveraging the loading on the pinions to thereby balance the loading on the pinions 22 and 24 in order that the power delivered to the output will be uniform and smooth.

To this end, and in keeping with the objectives of the invention, there is provided a lever 50, including an elongated arm 52, disposed in and movable within a plane defined by the parallel jack shafts 26 and 28, and having a fulcrum 54 disposed at the mid point of the arm 52. The fulcrum 54, which is defined by, or otherwise continuously bears against, a reaction member such as object —O—, which typically would be the casing of the transmission, engages the arm 52 such that the arm 52 can pivot about the fulcrum in the previously defined plane which permits the ends thereof to move toward and away from the gears 22 and 24.

The lever 50 may be formed with contact arms 56 and 57, and are preferably formed integrally with the arm 52 and extend outwardly toward the pinions 22 and 24 such as to be in direct contact with the pinion hubs 60 and 61, respectively. In order that the contact arms 56 and 57 can bear directly on the hubs 60 and 61, any suitable means for minimizing friction at the point of contact, e.g., thrust bearings, not specifically shown, are within the contemplation of the invention.

It will now be appreciated that when uneven loading on one of the pinions 22 or 24 results in a movement along the spline 26S or 28S toward the right, as seen in FIG. 1, in response to that movement, the lever is rocked about the fulcrum 54 such that a reaction force is exerted against the opposing hub 60 or 61, with a consequent balancing of the loads on the pinions, which is ongoing and continuous. Once the load is balanced between and among the pinions 22 and 24, those loads are transmitted in a uniform manner to the output shaft 42.

As an alternative to splined shafts upon which the gears 22 and 24 have limited freedom of axial movement, it is within the contemplation of the invention to journal the jack shafts 26 and 28 in the case, in a well known manner, or in some other stationary webbing within the casing, not shown, so that the entire shaft assembly will be capable of limited axial movement in response to loading on the gears 22 and 24 thereon.

It will be appreciated that while spur gears have been illustrated, at least on the output side P of the transmission, helical gears, or any other gear type suitable to cause the driving of output shaft 42, may be employed, since the loading on the output side is already balanced at the intermediate jack shaft gear sets.

In reference now to FIGS. 3, 4 and 5, the transmission configuration is, in accordance with the invention, modified from that shown and described with respect to FIG. 1, with a principal deviation being that two cooperating pairs of pairs of intermediate jack shaft gear sets are employed to transmit the load from the input side of the transmission to the output side thereof. While such configuration is difficult to illustrate in side elevation, FIG. 4 will make the structure evident.

Continuing with the reference to FIGS. 3, 4 and 5, and in keeping with the purpose of balancing power among all of the intermediate jack shafts to the output, another variation on the lever mechanism is illustrated for the purposes of accommodating paired pairs of intermediate shafts.

In this illustrated configuration, best visualized in FIG. 4, there are multiple pairs of driven pinions 72, 73, 74 and 75 provided on the input side of the transmission 20, each of which is secured to an intermediate jack shaft such as 26 or 28, which for illustrative purposes will be referenced as 26T and 28T, comprising the top pair as seen in FIG. 4, and 26B and 28B, comprising a bottom pair of jack shafts. As will become apparent from the ensuing discussion, the intermediate shafts work in pairs to accomplish the balancing objectives of the invention.

In keeping with the purposes of the present invention, total balance is achieved by the provision of lever devices in operative contact with pairs of intermediate shafts so that when an imbalance is reflected in axial movement of either a pinion mounted for limited movement on a shaft, or movement of the shaft itself, such movement is sensed by a communicating lever mechanism, which in turn is moved to balance loading between cooperating pairs. As is the case with the FIG. 1 configuration, thrust bearing, or their operative equivalent are employed to minimize friction between the levers and the rotating pinion hubs.

More specifically, there is provided levers, or arms, 79 and 80, which function to respond to and effect balancing of loads between pairs of shafts with which they are in contact, and which are governed by the same principals as are taught with respect to lever 50 in FIG. 1. Lever 79, for example, interacts with shafts 26T and 28T which carry pinions 72 and 73. Similarly, lever 80 operates relative to shafts 26B and 28B, and the pinions 74 and 75 mounted thereto. The levers 79 and 80 are rockable about points 56 and 57 which function as fulcrums, in the manner of 54 of FIG. 1.

The levers 79 and 80 balance the loads relative to their respective cooperating gear pairs. However, in order to balance the entire system, the invention contemplates an additional, secondary balancing system, which functions to sense, and, thus, balance the loads between working pairs of pinions.

To accomplish this objective, a secondary balancing mechanism 77 is provided, in which arms 79 and 80 are in operative contact with pairs of pinions. An intermediate web 82 supports outwardly extending legs 84 and 85, which are themselves, in contact with the contact arms 79 and 80 at the midpoint of each, where they function as a fulcrum for the contact arms.

In order that the web and legs attached thereto can freely respond to movement of the arms 79 and 80, in accordance with the invention, the web 82 is, in turn, mounted, for limited rotation, about a fixed, stable point P, such that the arms 79 and 80 are capable of limited rocking movement relative to the legs 84 and 85, while the web 82 will have limited movement about the point P. The result will be the delivery of balanced power to the output side of the transmission in accordance with the objectives of the invention.

In operation, assume that drive pinions 72 and 73 together are more heavily loaded than pinions 74 and 75, both pinions 72 and 73 will exert an equal lateral force to the right on balance lever 79, which will be greater than the combined lateral force exerted by pinions 74 and 75 on balance lever 80. This imbalance will cause balance lever 79 to move to the right, which will in turn cause balance mechanism 77 to rotate around pivot 68 such that arm 84 moves to the right, and arm 85 in response moves to the left. This movement of mechanism 77 reduces the load on balance lever 79 and, hence, on pinions 72 and 73, and increases the load on balance lever 80 and, hence, on pinions 74 and 75, and results in a balance in the load carried by all four pinions.

Figure 6:
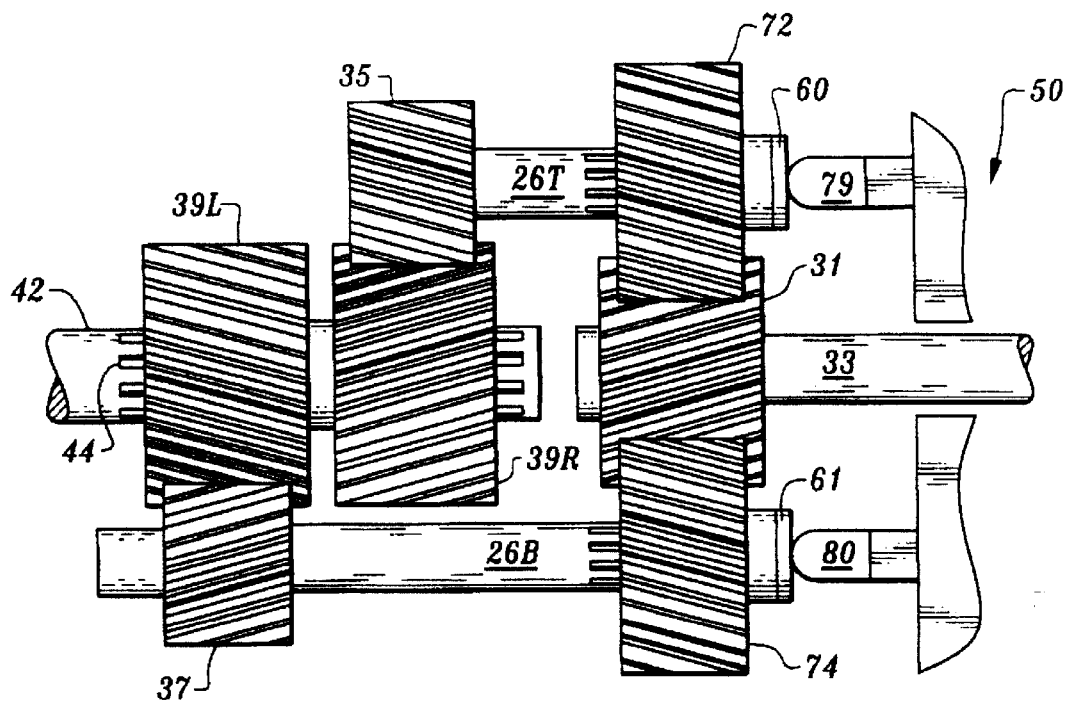
FIG. 6 is a side elevation, in the vein of FIG. 1, and illustrating a modified output gear set engaged by two pairs of intermediate gear sets, constructed in accordance with the present invention; and, FIG. 7 is a top plan view of the transmission of FIG. 6, illustrating the relative placement of the top intermediate gear sets, which is within the purview of the invention.
Figure 7:
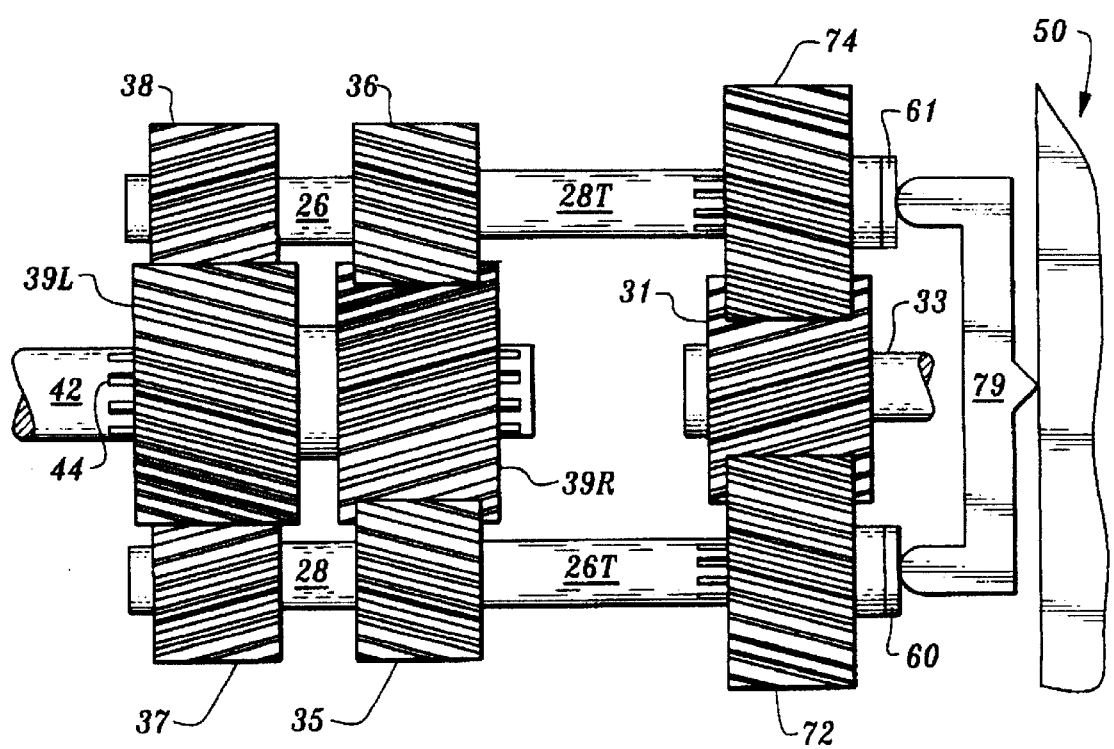

As may be seen in reference to FIGS. 6 and 7, the principals established by the present invention may be carried over to other direct drive transmission configurations.

For example, FIG. 6 represents a transmission having four separate shafts, similar in that respect to the FIG. 3 configuration, although the intermediate shafts are of varying lengths and the output shaft carries a pair of helical gears which engage and receive power from gears on the intermediate shaft.

Still referring to FIGS. 6 and 7, intermediate shafts 26T and 28T carry helical cut drive pinions 72 and 73, respectively, and helical cut driven pinions 35 and 36, respectively. Drive pinions 72 and 73 engage input drive gear 31, and driven pinions 35 and 36 engage output gear 39R. Likewise, intermediate shafts 26B and 28B carry helical cut pinions 74 and 75, which engage drive gear 31, and helical cut driven pinions 37 and 38 which engage output gear 39L. As in the FIG. 3 embodiment, drive pinions 72, 73, 74 and 75 are mounted for limited axial movement on the splined portions of the shaft which supports them.

In an operatively similar manner to the FIG. 3 embodiment, sensitivity to pinion movement is the vehicle by which loads are balanced. To this end, a lever 79 is positioned to react to movement by the pinions 72 and 73 to effect balanced loading there between. This is accomplished by mounting Lever 79 for limited rocking motion about a fulcrum point which is a fixed relative to the lever 79, such as to be functionally equivalent to the FIG. 1 embodiment. By the pivoting action of this lever, load is sensed by movement, and is then balanced between pinions 72 and 73.

In a substantially identical manner, a lever 80 is provided to balance the load between pinions 74 and 75. Lever 80 is engaged to create a fulcrum point that bears on a surface which is fixed relative to the lever and, in a like fashion, provides for balanced load between pinions 74 and 75. This arrangement differs from the embodiment in FIG. 3 in that there is a mechanism 77 which balances the load between balance levers 79 and 80, effecting load balance between the operative pairs of pinions 72, 73 on the one hand, and 74, 75 on the other, thereby balancing the output as hereinafter detailed.

Since the load on drive pinions 72 and 73 is balanced, the output load on shafts 26T and 28T is also evenly distributed among the shafts and, therefore, the load on driven pinions 35 and 36 is similarly balanced. Likewise, since the load on driven pinions 74 and 75 is balanced, the output load on shafts 26B and 28B is also balanced, and, therefore, the load on driven pinions 37 and 38 is also balanced.

Driven pinion pair 35 and 36 are identically helically cut and engage gear 39R and driven pinion pair 37 and 38 are identically helical cut in an equal but opposite sense to that of pinions 35, 36 and engage gear 39L. Gear pair 39R, 39L is fixedly attached to one another, but are spline mounted upon shaft 42 so as to allow limited axial movement along shaft 42. By virtue of the limited lateral movement allowed gear pair 39R, 39L, the entire output end functions as a dual helical gearing arrangement.

Once again, assuming a situation in which the load transmitted through pinion pair 72 and 73 is greater than that transmitted by pair 74 and 75, driven pinion pair 35 and 36 will transmit to gear 39R a greater load than driven pinion pair 37 and 38 does to gear 39L. In response to this imbalance, gear pair 39R, 39L will move laterally to balance the loading between the two input sides, as is characteristic of any dual helical gearing arrangement. This lateral movement of gear pair 39 results in balanced loading between output pinion pairs 35, 36 and 37, 38. Since the load on output pinion gears 35 and 36 is balanced by the action of balance lever 79 on input pinions 72 and 73, and the load on output pinions 37 and 38 is balanced by the action of balance lever 80 on input pinions 74 and 75, the load carried by each input pinion (72–75) and each output pinion (35–38) is equal and balanced.

It will be appreciated that there are other direct drive transmission configurations which would benefit from the novel load balancing apparatus illustrated herein, without departure from the invention.

Having now described a preferred embodiment of the invention as it will enhance the reliability and useful life of many direct drive transmissions, irrespective of the tooth configuration of the gears, what is claimed is:

1. In a direct drive transmission:
   an input drive shaft, an input gear, said input gear mounted on said input drive shaft;
   an output shaft, an output gear, said output gear being mounted on said output shaft;
   said input drive shaft and output shaft being mounted, in bearing relation, for rotation in a casing;
   at least one cooperating pair of intermediate shafts, at least two pinions disposed on each said intermediate shaft, a first one of said pinions being in driving engagement with said input gear, and second one of said pinions being in driving engagement with said output gear;
   said first pinion being mounted for limited axial movement relative to its said intermediate shaft;
   said intermediate shafts being coplaner to one another;
   means for balancing loads between each said cooperating pair of said intermediate shafts, comprising a lever mechanism, said lever mechanism including a lever, said lever being in operative contact with a pair of said first pinions, said lever being mounted for limited rocking movement in the plane of said intermediate shafts such that movement of one of said first pinions towards or away from said lever mechanism causes an equal but opposite application of force on said other said first pinion in the opposite direction to thereby balance loads on said intermediate shafts.

2. The direct drive transmission of claim 1, wherein each of said gears and said pinions have helical gear teeth.

3. The direct drive transmission of claim 2, wherein said output gear and each said pinion engaged therewith are split into halves such that the teeth on each said half are oppositely angled, said output shaft having splines formed thereon such that said gear halves mounted thereon are capable of limited axial movement relative to one another along said splines, and said intermediate pinion halves being fixed relative to one another on said intermediate shaft.

4. The direct drive transmission of claim 2, wherein said pinions in contact with said lever are mounted to said intermediate shaft for limited axial movement relative thereto, and wherein each of said gears and said pinions have helical gear teeth.

5. The direct drive transmission of claim 1, wherein said output gear and said second pinions engaged therewith are spur gears.

6. The direct drive transmission of claim 1, wherein said transmission includes an even number of cooperating pairs of intermediate shafts and each said pair being in contact with a said lever.

7. The direct drive transmission of claim 1, wherein said lever is mounted for rocking movement at its midpoint, about a fulcrum, said fulcrum being fixed relative to said lever.

8. The direct drive transmission of claim 1, wherein each said intermediate shaft is mounted in said casing for limited axial movement, and wherein said first and second pinions are affixed to said intermediate shaft.

9. The direct drive transmission of claim 1, wherein said first pinions are splined on to said intermediate shafts.

10. The direct drive transmission of claim 9, each of said gears and said pinions have helical gear teeth.

11. The direct drive transmission of claim 9, wherein two cooperating pairs of intermediate shafts are provided, and each said pair being in contact with a said lever.

12. The direct drive transmission of claim 9, wherein each said intermediate shafts is mounted in said casing for limited axial movement, and wherein said pinions are affixed to said intermediate shaft.

13. The direct drive transmission of claim 9, wherein each said intermediate shaft is mounted in said casing for limited axial movement, and wherein said pinions are affixed to said intermediate shaft, and wherein each of said gears and said pinions have helical gear teeth.

* * * * *